United States Patent
Grushkowitz et al.

(10) Patent No.: US 8,567,134 B1
(45) Date of Patent: Oct. 29, 2013

(54) SNAP-IN AND PROGRESSIVE LOCKING PHOTOVOLTAIC MODULE

(75) Inventors: Tyler Grushkowitz, Hayward, CA (US); Corey Cole, Richmond, CA (US); Brian Wares, Sacramento, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 13/539,051

(22) Filed: Jun. 29, 2012

(51) Int. Cl.
*E04D 13/18* (2006.01)

(52) U.S. Cl.
USPC .......................................... 52/173.3; 136/251

(58) Field of Classification Search
USPC .................... 52/173.3; 136/244, 251; 126/623
See application file for complete search history.

(56) References Cited

U.S. PATENT DOCUMENTS

| | | | | |
|---|---|---|---|---|
| 5,571,338 A | * | 11/1996 | Kadonome et al. | 136/251 |
| 6,269,596 B1 | * | 8/2001 | Ohtsuka et al. | 52/173.3 |
| 6,672,018 B2 | * | 1/2004 | Shingleton | 52/173.3 |
| 8,375,654 B1 | * | 2/2013 | West et al. | 52/173.3 |
| 2007/0212935 A1 | * | 9/2007 | Lenox | 439/567 |
| 2008/0302407 A1 | * | 12/2008 | Kobayashi | 136/251 |
| 2009/0229654 A1 | * | 9/2009 | Morita et al. | 136/251 |
| 2011/0252724 A1 | * | 10/2011 | Heisler | 52/173.3 |
| 2013/0008102 A1 | * | 1/2013 | Bindschedler et al. | 52/173.3 |

* cited by examiner

*Primary Examiner* — Christine T Cajilig
(74) *Attorney, Agent, or Firm* — Knobbe Martens Olson & Bear LLP

(57) ABSTRACT

A photovoltaic assembly for converting solar radiation to electrical energy is described. The photovoltaic assembly includes a first photovoltaic module, a second photovoltaic module and a coupling platform. The first and second photovoltaic module each have a first side for securing to the coupling platform. The coupling platform has a retractable locking mechanism and a retaining device. The retaining device is positioned such that the first side of the second PV module inhibits the retractable locking mechanism from releasing the first side of the first PV module. The coupling platform also includes a support member for mounting to a tracking drive system or a roof top.

20 Claims, 17 Drawing Sheets

SNAP-IN AND PROGRESSIVE LOCKING PHOTOVOLTAIC MODULE

BACKGROUND OF THE INVENTIONS

1. Field of the Inventions

Embodiments of the subject matter described herein relate generally to photovoltaic assemblies including solar cells, photovoltaic modules, photovoltaic tracker systems, roof top mounted photovoltaic systems and associated photovoltaic module coupling devices. More particularly, one or more embodiments of the present invention relate to photovoltaic modules, coupling platforms and mounting systems.

2. Description of the Related Art

Solar cells are well known devices for converting solar radiation to electrical energy. Several solar cells can be connected to together to form a solar cell array. The solar cell array can be packaged into a photovoltaic (PV) module using various processes and encapsulant materials. These PV modules are commonly mounted to a PV system such as a tracking drive system or a roof top mounted PV system through a support member. A PV assembly can be composed of one or more PV modules and support members. Generally support members are composed of fasteners or require special tools to attach PV modules onto a PV system. Thus it would be beneficial to provide a quick secure module attachment that ensures field quality, easy installation and enabling a competitive advantage in the PV solar industry. One or more embodiments of the present invention pertain to PV assemblies that present alternative means of coupling at least two photovoltaic modules through a support member to allow for the described mounting advantages on a PV system.

SUMMARY

In accordance with at least one embodiment disclosed herein, a photovoltaic (PV) assembly can comprise a first and second PV module, each module comprising, a front side facing the sun during normal operation and a back side opposite the front side. A frame surrounding the PV module can comprise first, second, third and fourth sides and a plurality of openings disposed within the frame. A coupling platform can comprise a support member and a retractable locking mechanism adapted to attach to the opening at the first side of the first PV module. An upright hook shaped retaining device can be adapted to attach to the opening at the first side of the second PV module, wherein the upright hook shaped retaining device is positioned such that the first side of the second PV module inhibits the retractable locking mechanism from releasing the first PV module.

In accordance with another embodiment, a photovoltaic assembly can comprise a first and second PV module. Each PV module can comprise a front side facing the sun during normal operation and a back side opposite the front side, and first, second, third and fourth sides. A coupling platform can comprise a support member, a retractable locking mechanism adapted to receive the first side of the first PV module, and a U-shaped retaining device adapted to receive the first side of the second PV module, wherein the U-shaped retaining device is positioned such that the first side of the second PV module inhibits the retractable locking mechanism from releasing the first PV module.

In accordance with yet another embodiment, a PV assembly can comprise a first and second PV module. Each PV module can comprise a front side facing the sun during normal operation and a back side opposite the front side. An I-beam frame can surrounding the PV module and can comprise first, second, third and fourth sides and a plurality of receptacles disposed within the I-beam frame. Additionally, a coupling platform can comprise a support member, a retractable locking mechanism adapted to attach to the receptacle at the first side of the first PV module, and an upright hook shaped retaining device adapted to attach to the receptacle at the first side of the second PV module, wherein the upright hook shaped retaining device is positioned such that the first side of the second PV module inhibits the retractable locking mechanism from releasing the first PV module.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
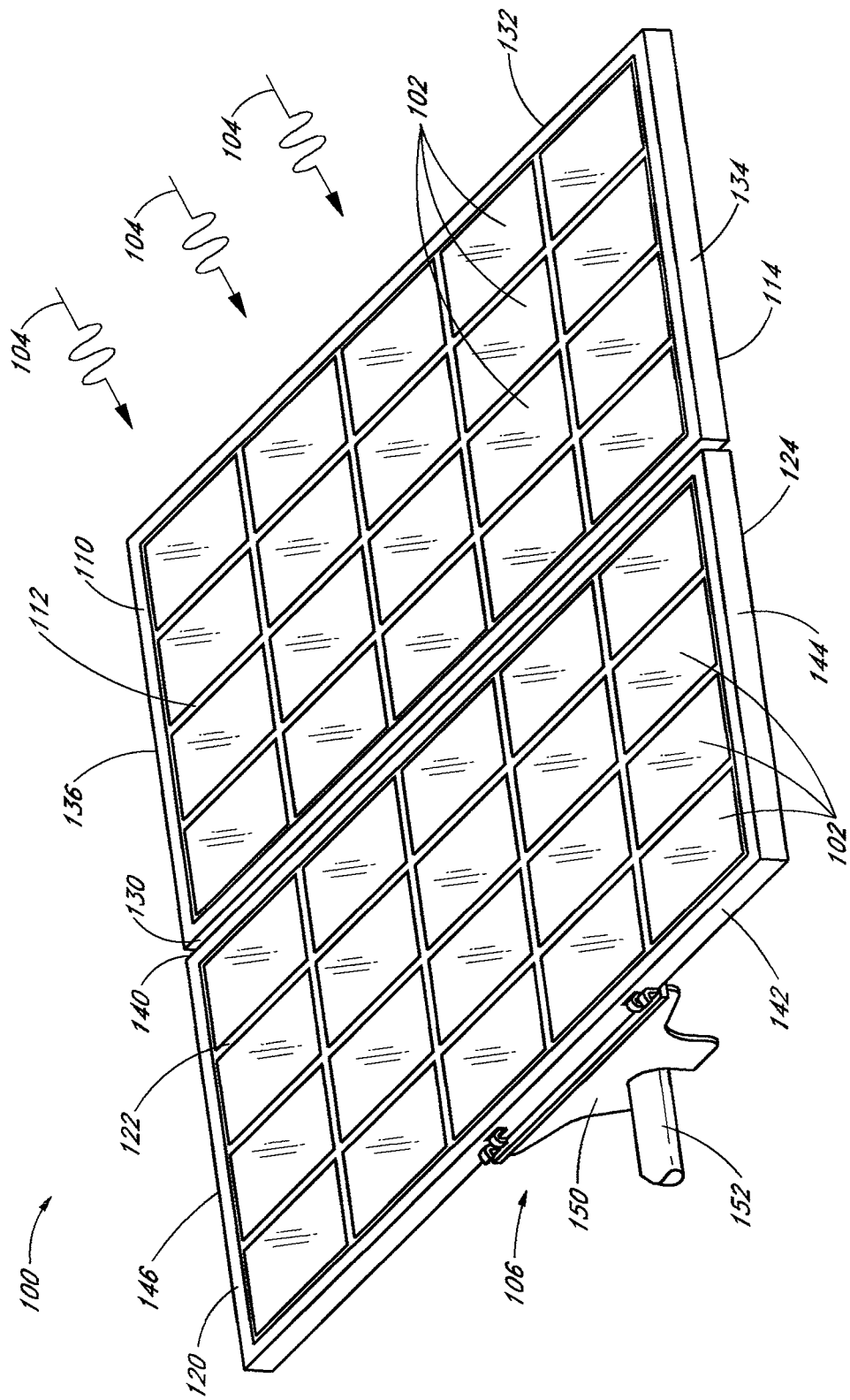
FIG. 1 is a schematic perspective view of a photovoltaic assembly in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology can also be used in the following description for the purpose of reference only, and thus is not intended to be limiting. For example, terms such as "upper", "middle", and "lower" refer to directions in the drawings to which reference is made. Terms such as "front" and "back" describe the orientation and/or location of portions of the component within a consistent but arbitrary frame of reference which is made clear by reference to the text and the associated drawings describing the component under discussion. Such terminology can include the words specifically mentioned above, derivatives thereof, and words of similar import. Similarly, the terms "first", "second", and other such numerical terms referring to structures do not imply a sequence or order unless clearly indicated by the context.

"Inhibit"—As used herein, the term inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of the PV assembly, additional intervening elements, devices, features, or components may be present in an embodiment of the depicted subject matter.

A photovoltaic (PV) assembly 100 for converting solar radiation to electrical energy is disclosed herein. The PV assembly 100 can have a first PV module, second PV module and a coupling platform. Both PV modules can have a front side facing the sun during normal operation and a back side opposite the front side. Furthermore both modules can have a frame. The frame can have a first, second, third, fourth side and a plurality of openings. The coupling platform can have a retractable locking mechanism adapted to attach to one of the plurality of openings at the first side of the first PV module. The coupling platform also has an upright hook shaped retaining device adapted to attach to the opening at the first side of the second PV module. The upright hook shaped retaining device can be positioned such that the first side of the second PV module inhibits the retractable locking mechanism from releasing the first PV module. The coupling platform can also have a support member. The support member can provide a mechanism for mounting the first PV module and the second PV module through the coupling platform onto a tracking drive system or a roof top.

Another PV assembly for converting solar radiation to electrical energy is disclosed herein. The PV assembly has a first PV module, second PV module and a coupling platform. Both the PV modules have a front side facing the sun during normal operation and a back side opposite the front side. As with the first embodiment both PV modules can have a first, second, third and fourth side. The coupling platform can have a retractable locking mechanism adapted to receive the first side of the first PV module. The coupling platform can also have a U-shaped retaining device adapted to receive the first side of the second PV module. The U-shaped retaining device can be positioned such that the first side of the second PV module inhibits the retractable locking mechanism from releasing the first PV module. Similar to that disclosed above, the coupling platform can have a support member. The support member can provide a mechanism for mounting the first PV module and the second PV module through the coupling platform onto a tracking drive system or a roof top.

Still another PV assembly for converting solar radiation to electrical energy is disclosed herein. The PV assembly has a first PV module, second PV module and a coupling platform. Both PV modules have a front side facing the sun during normal operation and a back side opposite the front side. Also, both PV modules have an I-beam frame. The I-beam frame of both PV modules can have a first, second, third, fourth side and a plurality of receptacles disposed within the I-beam frame. The coupling platform has a retractable locking mechanism adapted to attach to the receptacle at the first side of the first PV module. The coupling platform can also have an upright hook shaped retaining device adapted to attach to the receptacle at the first side of the second PV module. The upright hook shaped retaining device can be positioned such that the first side of the second PV module inhibits the retractable locking mechanism from releasing the first PV module. Similar to that disclosed in both embodiments above, the coupling platform can have a support member. The support member can provide a mechanism for mounting the first PV module and the second PV module through the coupling platform onto a PV tracking system or a roof top.

FIGS. 1-23 illustrate various embodiments of a photovoltaic assembly for converting solar radiation to electrical energy. Numerous specific details are provided, such as examples of apparatuses and components to provide a thorough understanding of at least some embodiments of the present inventions. It is to be understood, however, that other embodiments of the present inventions can be practiced without one or more of the specific details set forth below. In other instances, well-known details are not shown or described in order to avoid obscuring aspects of certain embodiments of the present inventions.

With reference to FIG. 1, a PV assembly 100 having a first PV module 110, a second PV module 120 and a coupling platform 106 is shown. The first PV module 110 and second PV module 120 have respective front sides 112, 122 that face the sun to collect light 104 during normal operation. The first PV module 110 and second PV module 120 also have respective back sides 114, 124 opposite the front sides 112, 122.

A plurality of solar cells 102 can be disposed within the PV modules 110, 120. The first PV module 110 and second PV module 120 can have first 130, 140, second, 132, 142, third 134, 144 and fourth 136, 146 sides. The coupling platform 106 can have a support member 150 connected to a torque tube 152 for rotating the PV assembly 100 about an axis. The support member 150 can be a U-shaped saddle mount type of support member, as depicted in FIG. 1.

Figure 2:
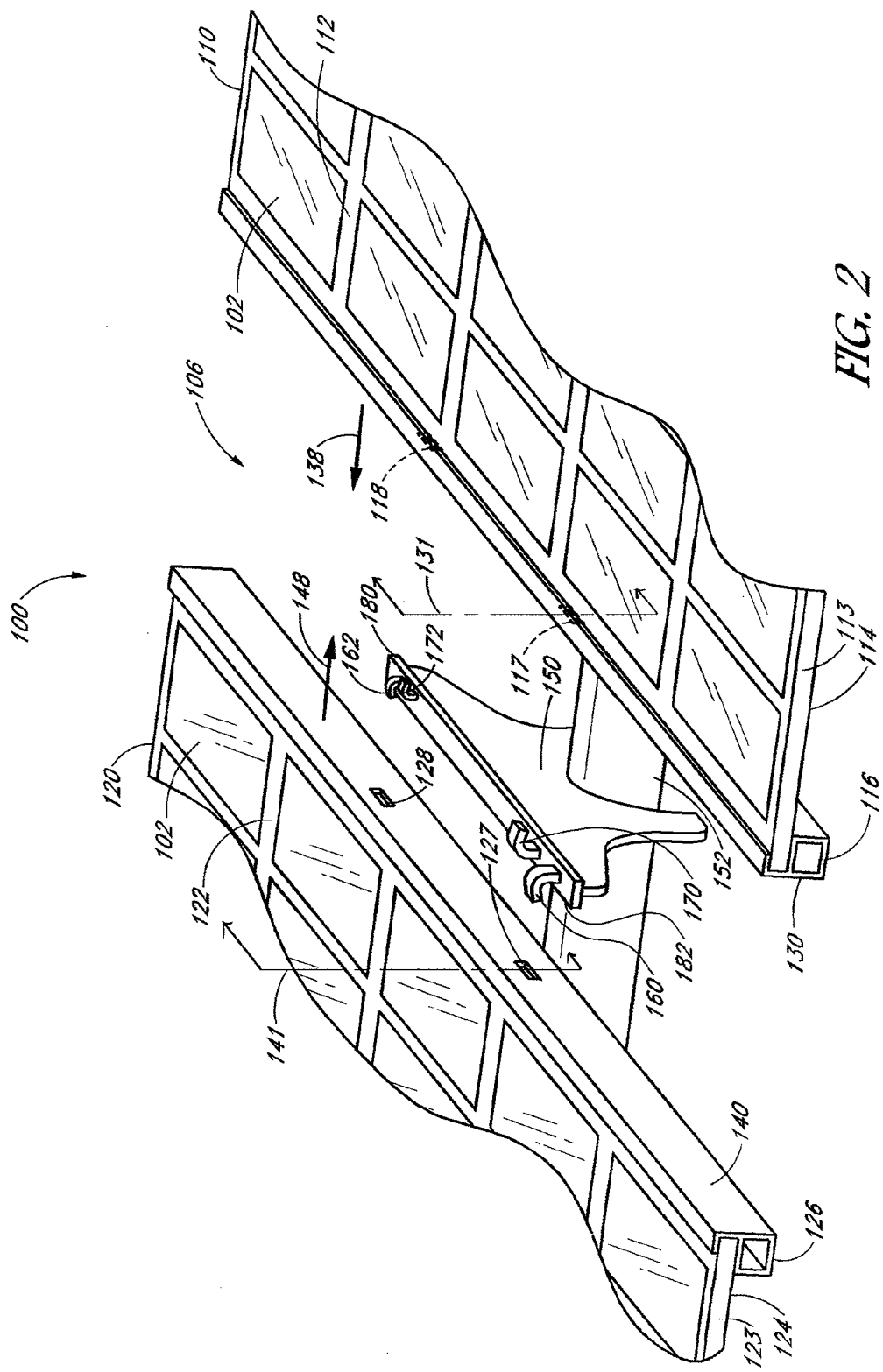
FIG. 2 is an enlarged schematic and partially exploded perspective view of the photovoltaic assembly of FIG. 1.

FIG. 2 illustrates an enlarged perspective view of the PV assembly 100 described in association with FIG. 1. In some embodiments, the PV modules 110, 120 have frames 116, 126 and laminates 113, 123, respectively, containing a plurality of solar cells 102. The frame 116 of the first PV module 110 can have a first opening 117 and second opening 118. The frame 126 of the second PV module 120 can have a first opening 127 and second opening 128.

The laminate 113, 123 can include one or more encapsulating layers which surround and enclose the solar cells 102. The solar cells 102 face the front sides 112, 122 of the PV modules 110, 120, respectively.

The coupling platform 106 can have a first upright hook shaped retaining device 160, a second upright hook shaped retaining device 162, a first retractable locking mechanism 170 and a second retractable locking mechanism 172. In some embodiments, the retractable locking mechanisms 170, 172 can be bendable, upright latches.

The first side 130 of first PV module 110 can be joined with the coupling platform 106 by moving the first PV module 110 toward the coupling platform 106, in the first direction 138. The first side 140 of the second PV module 120 can also be joined with the coupling platform 106 by moving the second PV module 120 toward the coupling platform 106 along the second direction 148. Dotted cross-sectional line 131, 141 indicates the viewing direction of FIGS. 3, 4, 5, and 6.

Figure 3:
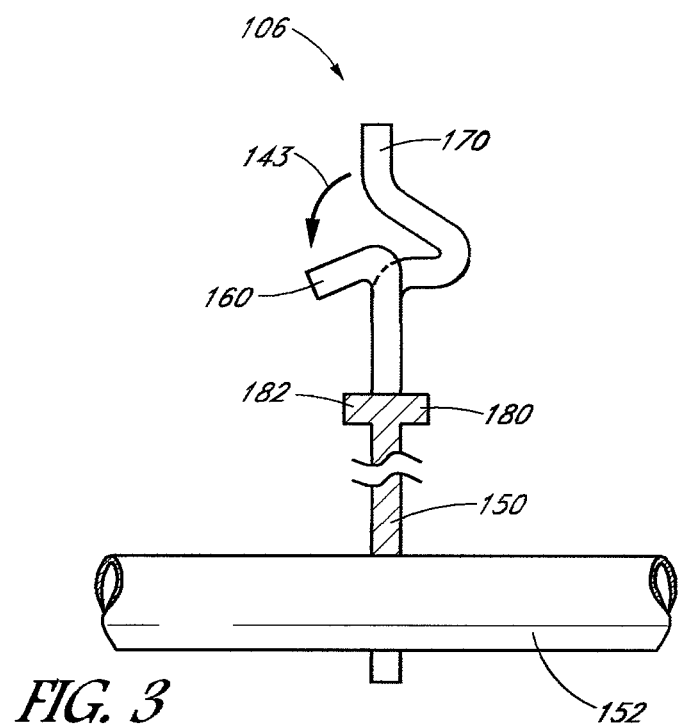
FIG. 3 is a schematic cross-sectional diagram of a coupling platform of the assembly of FIG. 1.
Figure 4:
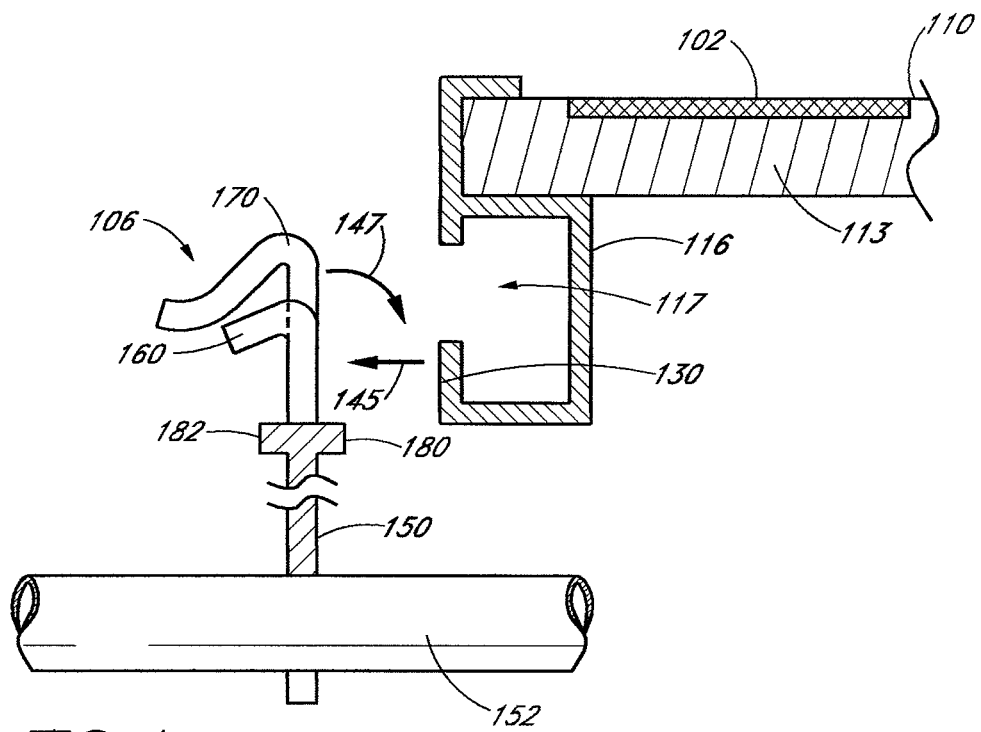
FIG. 4 is another schematic cross-sectional diagram of the coupling platform of FIG. 1.

With reference to FIG. 3, during use, the first retractable locking mechanism 170 can be bent in a bending direction 143 toward the first upright hook shaped retaining device 160 so as to position the first retractable locking mechanism 170 in an initial upright position, as shown in FIG. 4.

FIG. 4 illustrates a state of the first PV module 110 during the process of being secured to the coupling platform 106, as it moves in a mounting direction 145. During the process of securing the first PV module 110 to the coupling platform 106, the first retractable locking mechanism 170 can be bent along a locking direction 143, from an initial upright position, allowing the first opening 117 to receive the first retractable locking mechanism 170. The resulting configuration of the coupling platform 106 is the configuration shown in FIG. 5.

Figure 5:
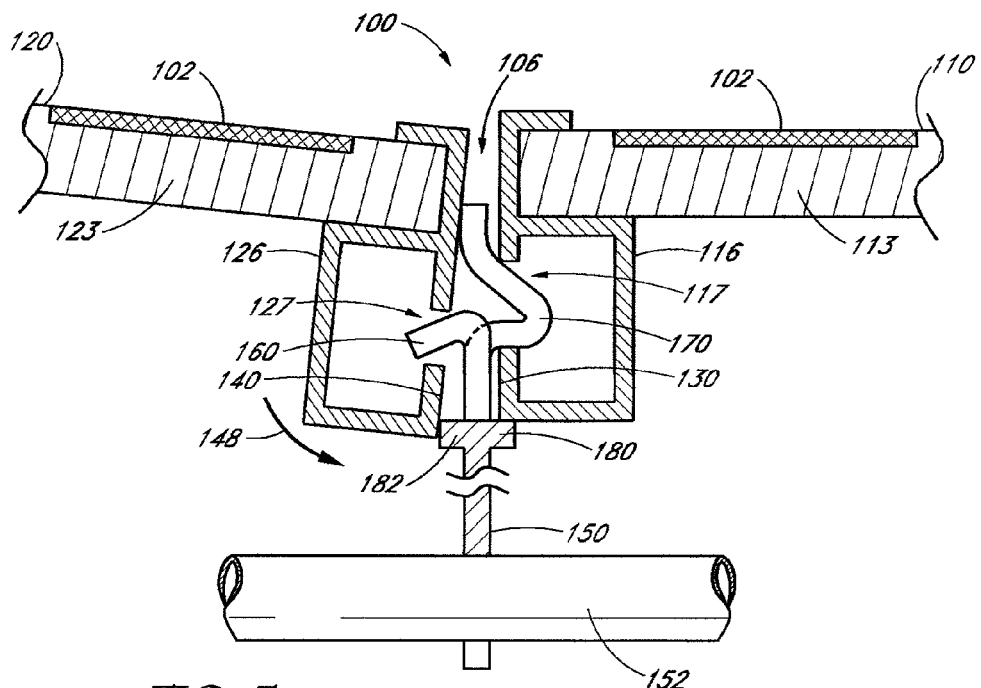
FIG. 5 is a schematic cross-sectional diagram of the photovoltaic assembly of FIG. 1.

In an alternative embodiment, the first retractable locking mechanism 170 can be left in its original state, and the first PV module 110 can be moved into engagement with the first retractable locking mechanism 170, as shown in FIG. 5. The second PV module 120 can then be secured to the coupling platform 106 by moving in the mounting direction 148, such that the first upright hook shaped retaining device 160 is slipped into the first opening 127.

In some embodiments, the first upright hook shaped retaining device 160 and the second upright hook shaped retaining device 162 can be a directional hook shaped retaining device adapted to locate features to a specific side (e.g., first, second, third or fourth sides) of the any one side of the PV modules. A second support flange 182 can be provided for additional support to the frame 126.

Figure 6:
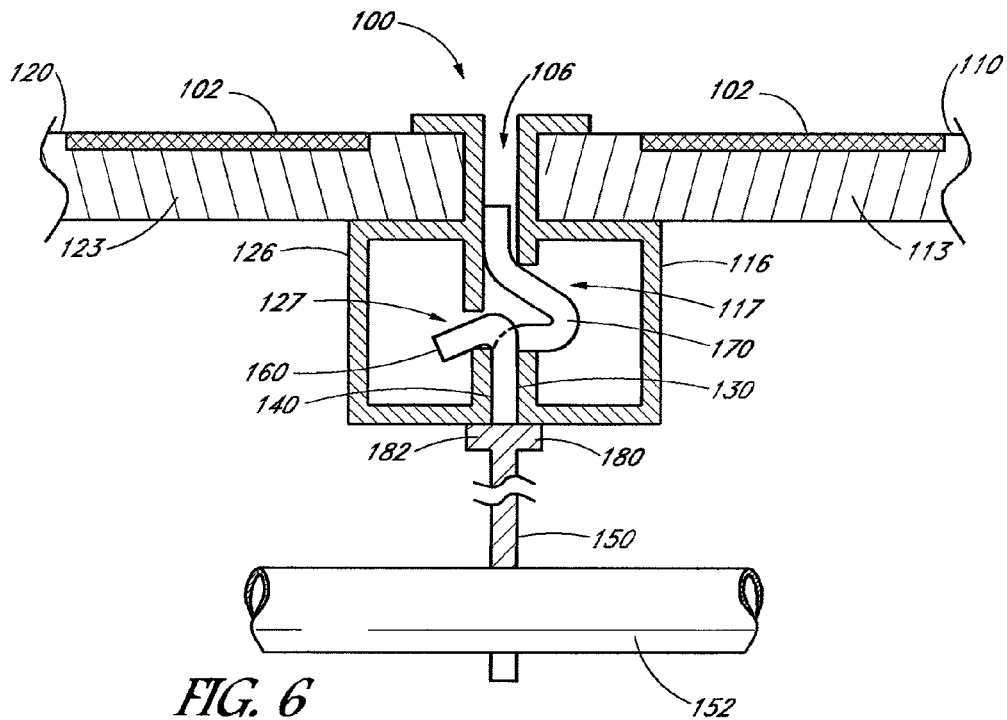
FIG. 6 is another schematic cross-sectional diagram of the photovoltaic assembly of FIG. 1.

FIG. 6 illustrates the first side 140 of the second PV module mounted to the coupling platform 106. The first side 140 of the second PV module 120 can help resist or prevent the movement of first retractable locking mechanism 170. The first retractable locking mechanism 170 can be held in place within the first opening 117 of the frame 116 of the first PV module 110. Thus, the coupling platform 106 allows for securing the first PV module 110 via the mechanism of mounting of the second PV module 120. A first support flange 180 can also be provided for additional support to the frame 116.

Optionally, the first support flange 180 and second support flange 182 can include a plurality of horizontal bent flanges adapted to support both the first PV module 110 and second PV module 120.

Figure 7:
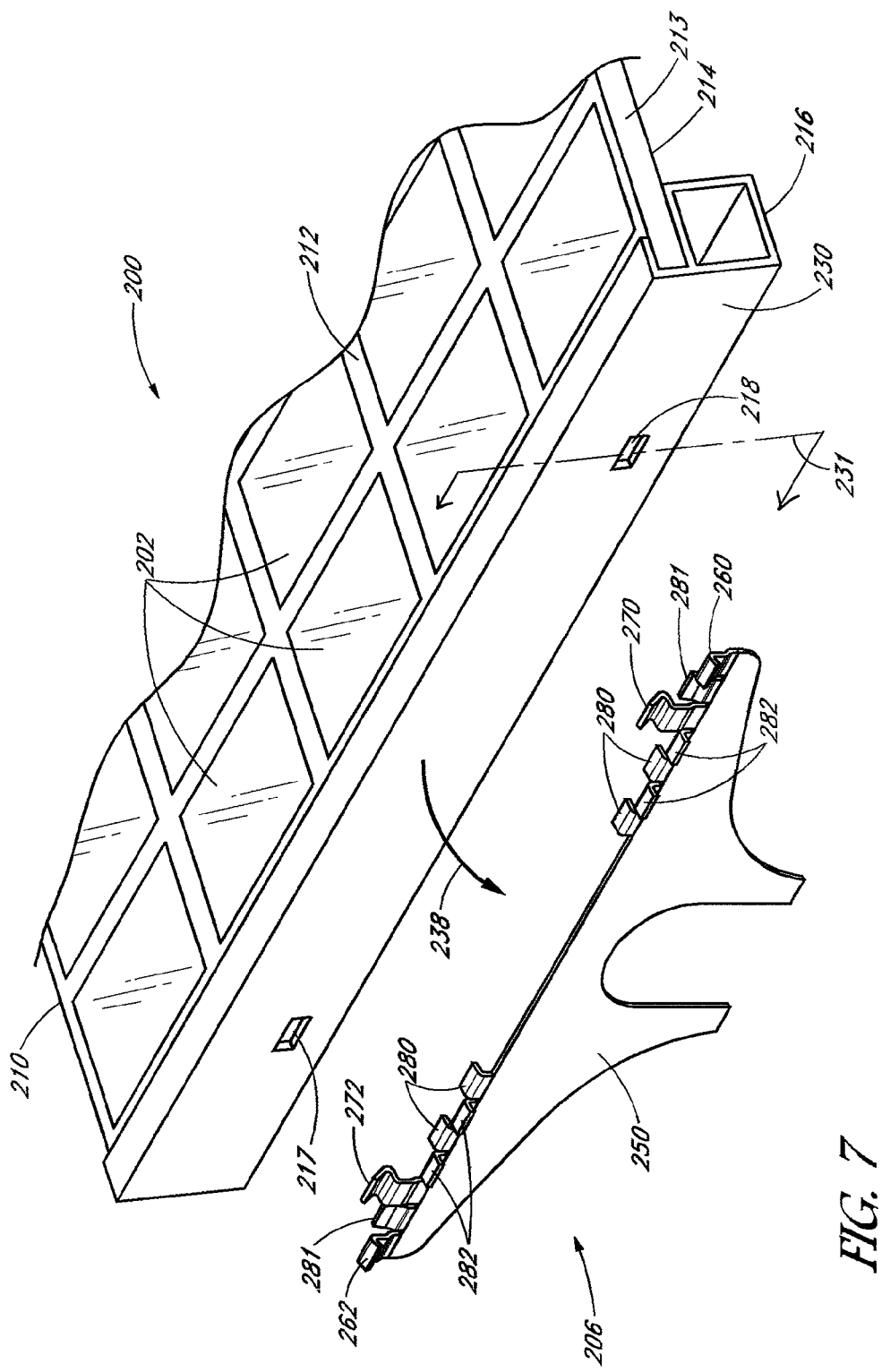
FIG. 7 is a schematic perspective view of a photovoltaic assembly in accordance with another embodiment.
Figure 8:
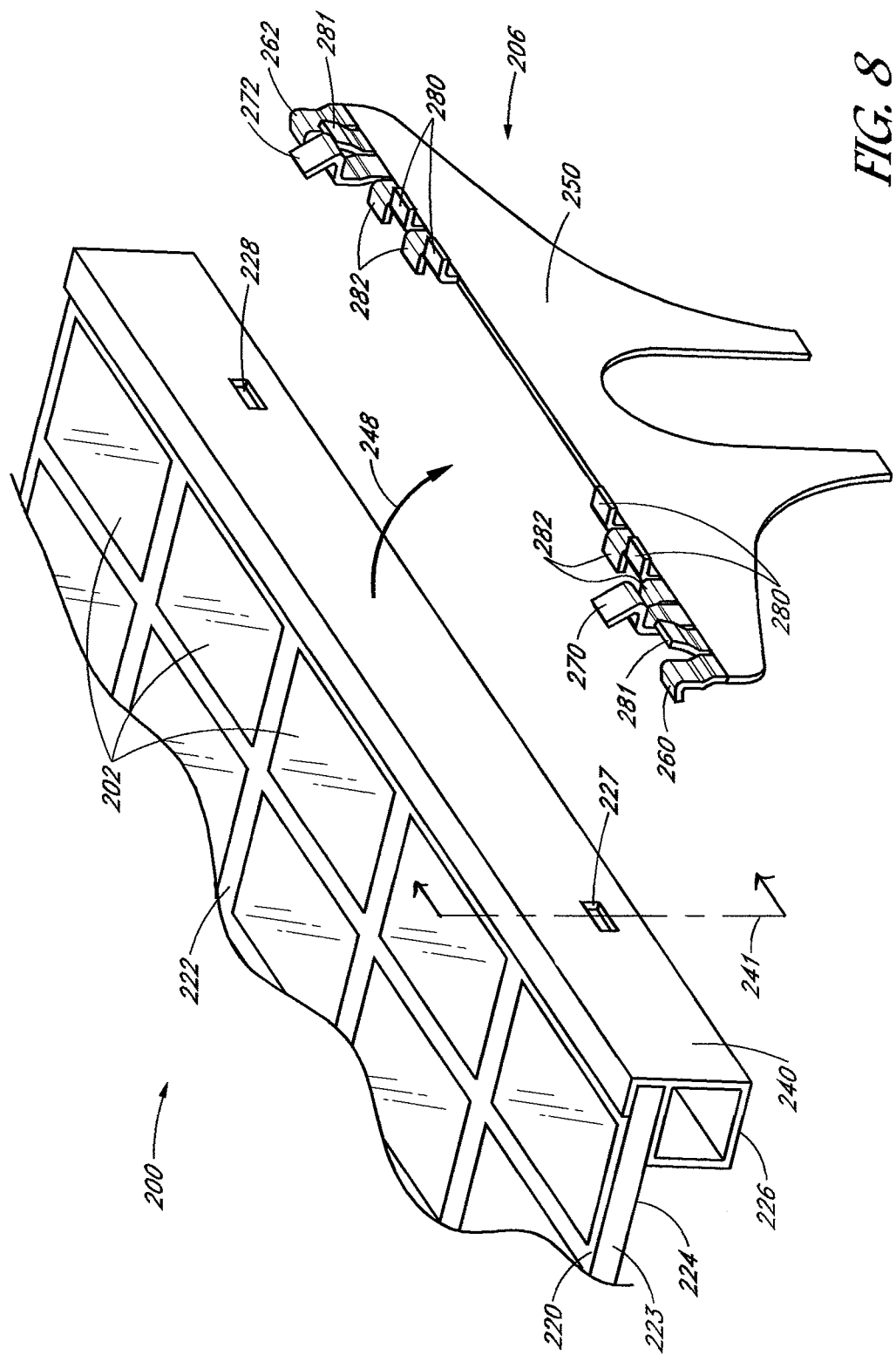
FIG. 8 is another schematic perspective view of the photovoltaic assembly of FIG. 5.

FIGS. 7 and 8 illustrate a schematic perspective view of another embodiment of a PV assembly 200. Unless otherwise specified below, the numeric indicators used to refer to the components in FIGS. 1-6 are similar to the components in FIGS. 7-23, except that the index has been incremented in increasing units of 100.

The PV assembly 200 can include a first PV module 210, a second PV module 220 and a coupling platform 206. The first and second PV module 210, 220 can have a frame 216, 226 and a laminate 213, 223. The PV assembly 200 can also include a plurality of solar cells 202.

The frame 216, 226 of the first and second PV module 210, 220 can each have a first opening 217, 227 and a second opening 218, 228. The coupling platform 206 cab include a first upright hook shaped retaining device 260, a second upright hook shaped retaining device 262, a first retractable locking mechanism 270 and a second retractable locking mechanism 272.

A first mounting direction 238 indicates a direction along which the first PV module 210 can be moved to secure the first side 230 of first PV module 210. Similarly, a second mounting direction 248 indicates the direction along which the second PV module 220 can be moved to secure the second PV module 220.

The coupling platform 206 can also include an upright support flange 281 to prevent the lateral movement of the first PV module 210. In still another embodiment, a first support flange 280 and second support flange 282 include a plurality of horizontal bent flanges that support both the first PV module 210 and second PV module 220. A dotted cross-sectional line 231, 241 indicates the viewing direction of the cross-sectional illustration of FIG. 9.

Figure 9:
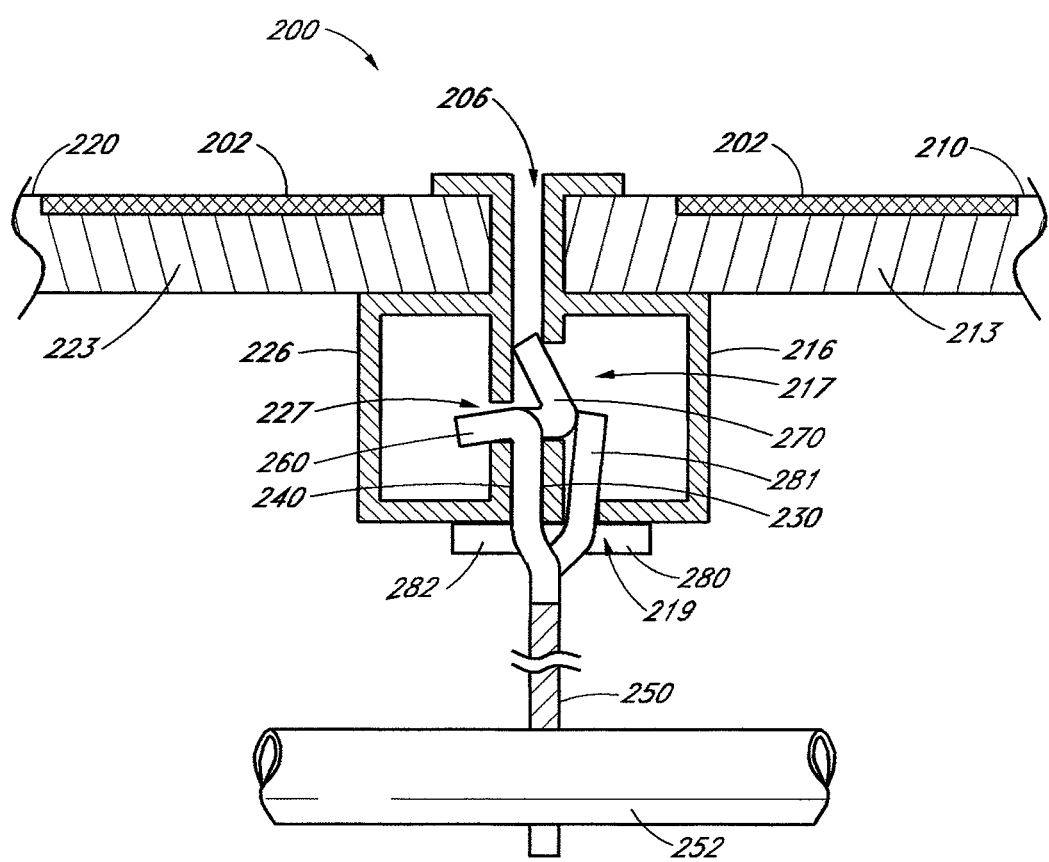
FIG. 9 is a schematic cross-sectional diagram of the photovoltaic assembly of FIG. 7 in accordance with another embodiment.

FIG. 9 illustrates a schematic cross-sectional diagram of the PV assembly 200 described in association with FIGS. 7 and 8. As discussed above, the first and second PV modules 210, 220 have a frame 216, 226, laminate 213, 223, and a plurality of solar cells 202. The first side 240 of the second PV module can be secured to the coupling platform 206 allowing the first side 240 of the second PV module 220 to prevent the movement of first retractable locking mechanism 270. The first retractable locking mechanism 270 is held in place within the first opening 217 of the frame 216.

A first and second support flange 280, 282 can provide structural support to both PV modules by extend laterally from the coupling platform 206. In some embodiments, the frame 216 can include a third 219 and fourth opening. The third 219 and fourth opening can be adapted to receive the upright support flange 281, providing additional locking mechanism and support to the first PV module 210. In some embodiments, a third 219 and fourth opening is not required provided the support flanges 280, 281 fully support the weight of the both the first and second PV Modules 210, 220.

Figure 10:
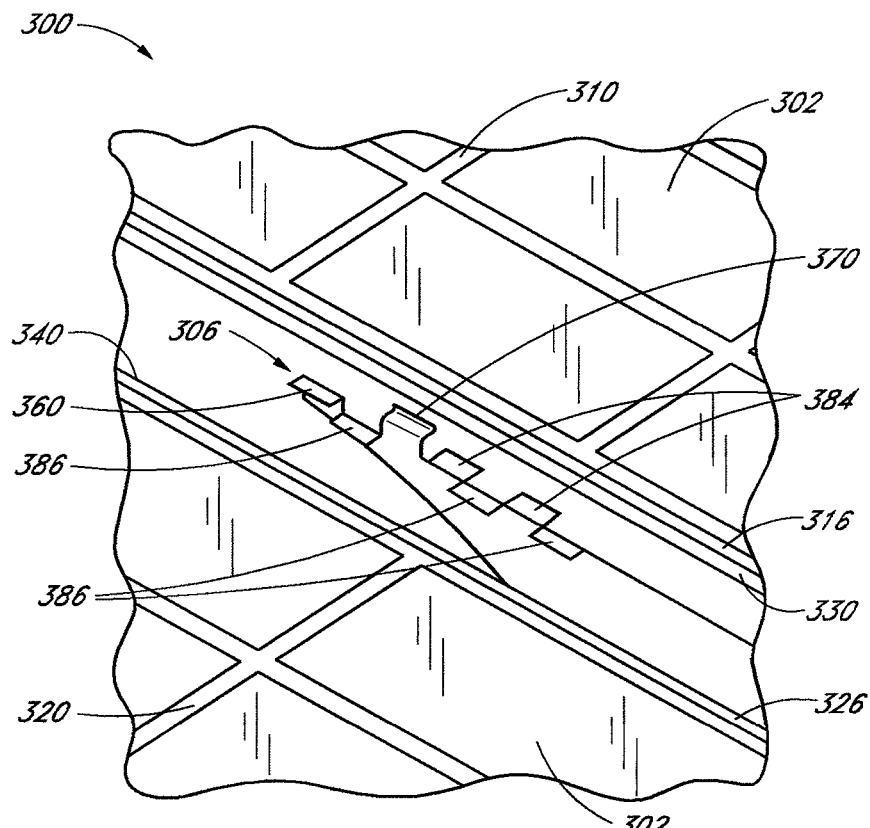
FIG. 10 is a schematic perspective view of a photovoltaic assembly in accordance with still another embodiment.

With reference to FIG. 10, a schematic cross-sectional diagram of yet another embodiment of a PV assembly 300 is shown. The PV assembly 300 has a first PV module 310, a second PV module 320, and a coupling platform 306. In some embodiments, the first and second PV module 310, 320 can have a first edge protection member 316 and a second edge protection member 326 which enclose around the top, bottom and side edges 330, 340 of the first and second PV module 310, 320. The first and second PV module 310, 320 can have a first side 330, 340 along their respective edge protection member 316, 326. The coupling platform 306 can have a U-shaped retaining device 360 and retractable locking mechanism 370. A plurality of first support flanges 384 and a plurality of second support flanges 386 can provide additional support to both PV modules.

Optionally, the edge protection member 316, 326 can provide protection to the module edges and have no structural qualities. Thus, frameless modules can be used in conjunction with the embodiment where the edge protection members do not have sufficient structural support to interfere with the structural support provided by the coupling platform 306. Other embodiments can be practiced without one or more of the specific details, such as that which was just described wherein the edge protection members have no structural qualities.

Figure 11:
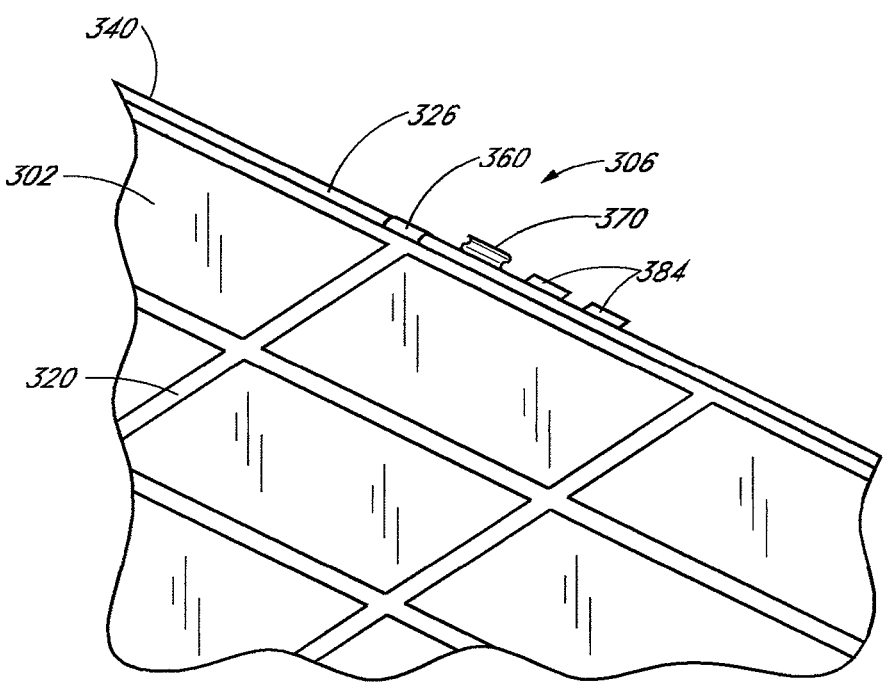
FIG. 11 is another schematic perspective view of the photovoltaic assembly of FIG. 10 in accordance with still another embodiment.

FIG. 11 illustrates the second PV module 320 secured to the coupling platform 306. The first side 340 and the edge protection member 326 of the second PV module 320 are shown. Also shown is the coupling platform 306 including the retractable locking mechanism 370 and the plurality of first support flanges 384.

Figure 12:
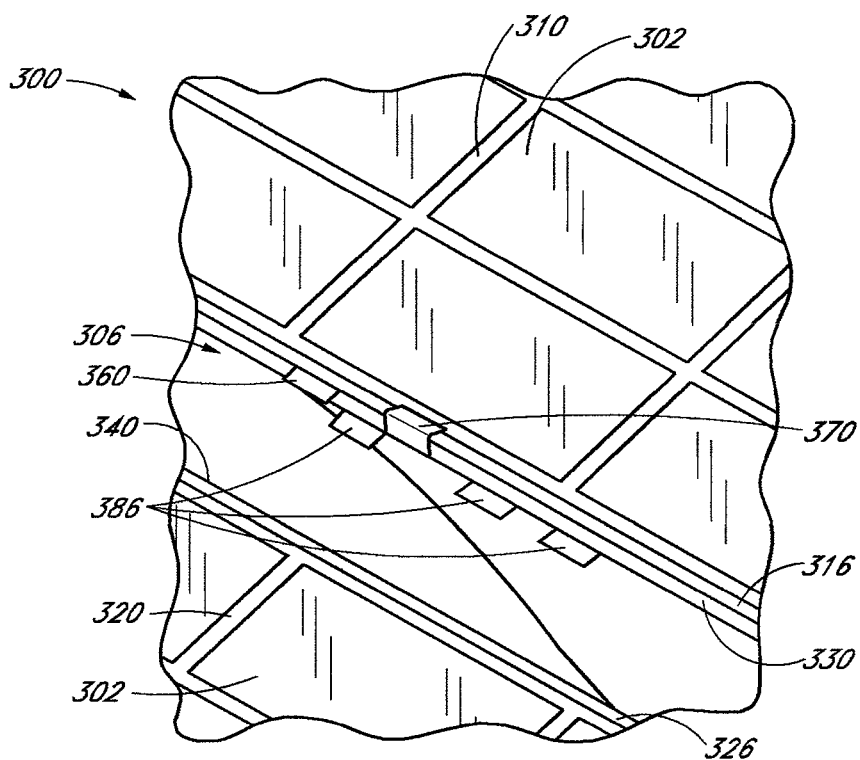
FIG. 12 is yet another schematic perspective view of the photovoltaic assembly of FIG. 10 in accordance with still another embodiment.

Similar to FIG. 11, FIG. 12 illustrates a process of securing the first PV module 310 to the coupling platform 306. The retractable locking mechanism 370, the U-shaped retaining device 360 and the plurality of second support flanges 386 are shown. The first side 330 and the edge protection member 316 of the first PV module 310 are also shown. The related components to the second PV module 320 are also depicted.

Figure 13:
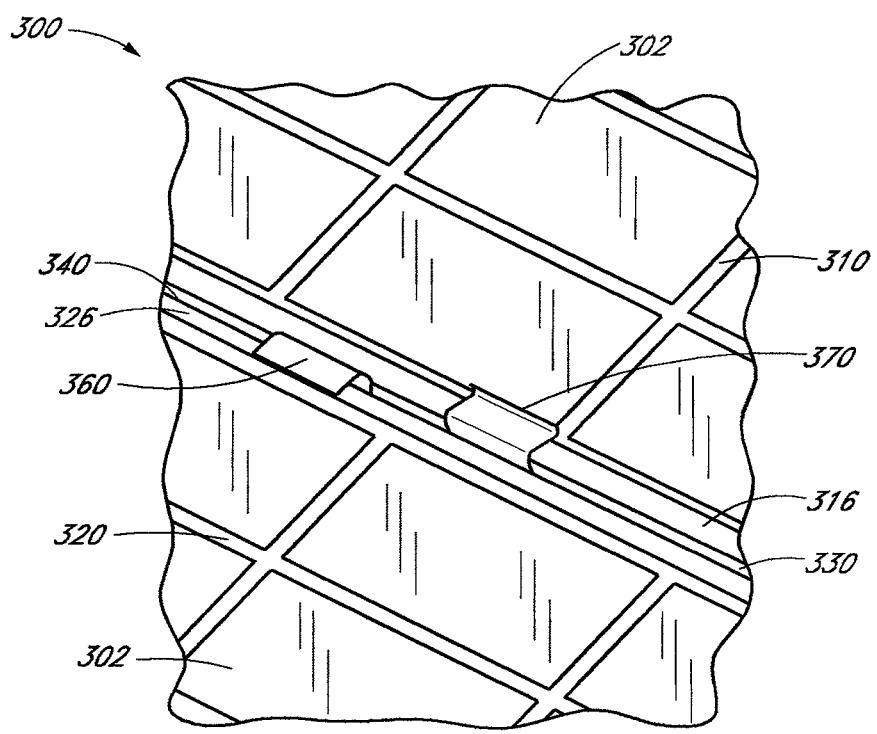
FIG. 13 is still another schematic perspective view of the photovoltaic assembly of FIG. 10 in accordance with another embodiment.

With reference to FIG. 13, a fully secured PV assembly 300 is shown. The first side 330 of the first PV module 310 is secured to the retractable locking mechanism 370. The first side 340 of the second PV module 320 is secured to the U-shaped retaining device 360. The first edge protection member 316 and the second edge protection member 326 are also shown.

Figure 14:
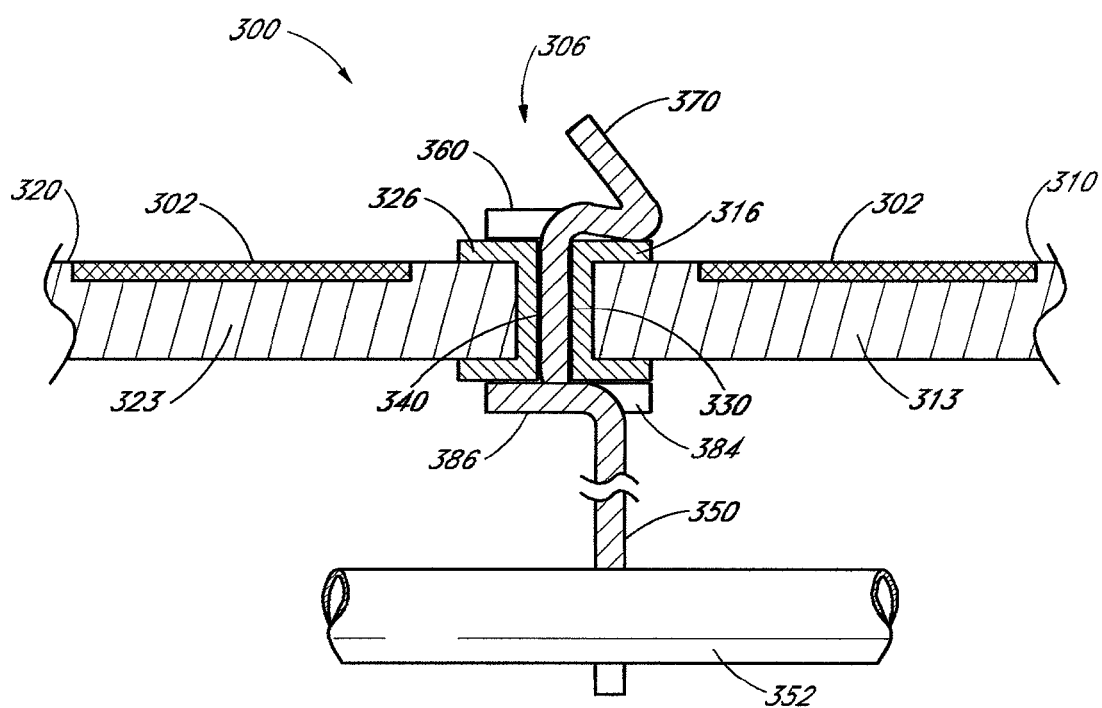
FIG. 14 is a schematic cross-sectional diagram of the photovoltaic assembly of FIG. 10 in accordance with still another embodiment.

FIG. 14 illustrates a schematic cross-sectional diagram of the PV assembly 300 described in association with FIGS. 10-13. Similar to the above, a cross section of the first PV module 310, second PV module 320 and coupling assembly 306 is shown. The first and second PV modules 310, 320 have a frame 316, 326, laminate 313, 323 and a plurality of solar cells 302. In the same or similar way disclosed above, the first side 340 of the second PV module can be secured to the coupling platform 306 to prevent the movement of first retractable locking mechanism 370. Thus, the first PV module 310 can be secured to the coupling platform 306 in such a manner. Also, a first plurality of support flanges 384 and second plurality of support flanges 386 can be included to provide additional structural support.

Figure 15:
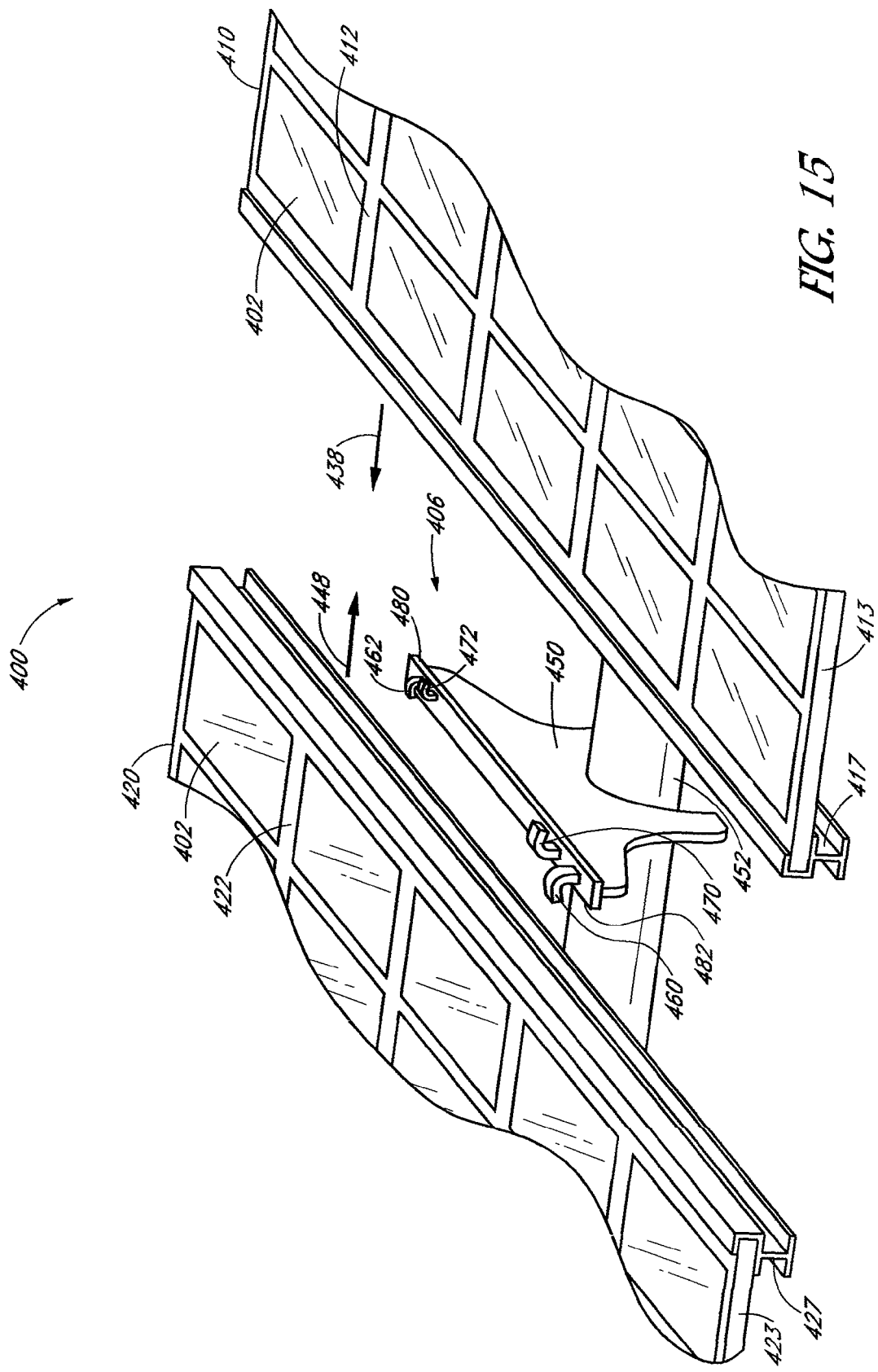
FIG. 15 is a schematic perspective view of a photovoltaic assembly in accordance with yet another embodiment.

FIG. 15 illustrates a schematic perspective view of yet another embodiment of a PV assembly 400. The PV assembly 400 can include a first PV module 410, a second PV module 420 and a coupling platform 406. Similar to what has been described above, the first and second PV module 410, 420 can have an I-beam frame 417, 427, a laminate 413, 423 and a plurality of solar cells 402. The coupling platform 406 can have a first upright hook shaped retaining device 460, a second upright hook shaped retaining device 462, a first retractable locking mechanism 470 and a second retractable locking mechanism 472.

Figure 16:
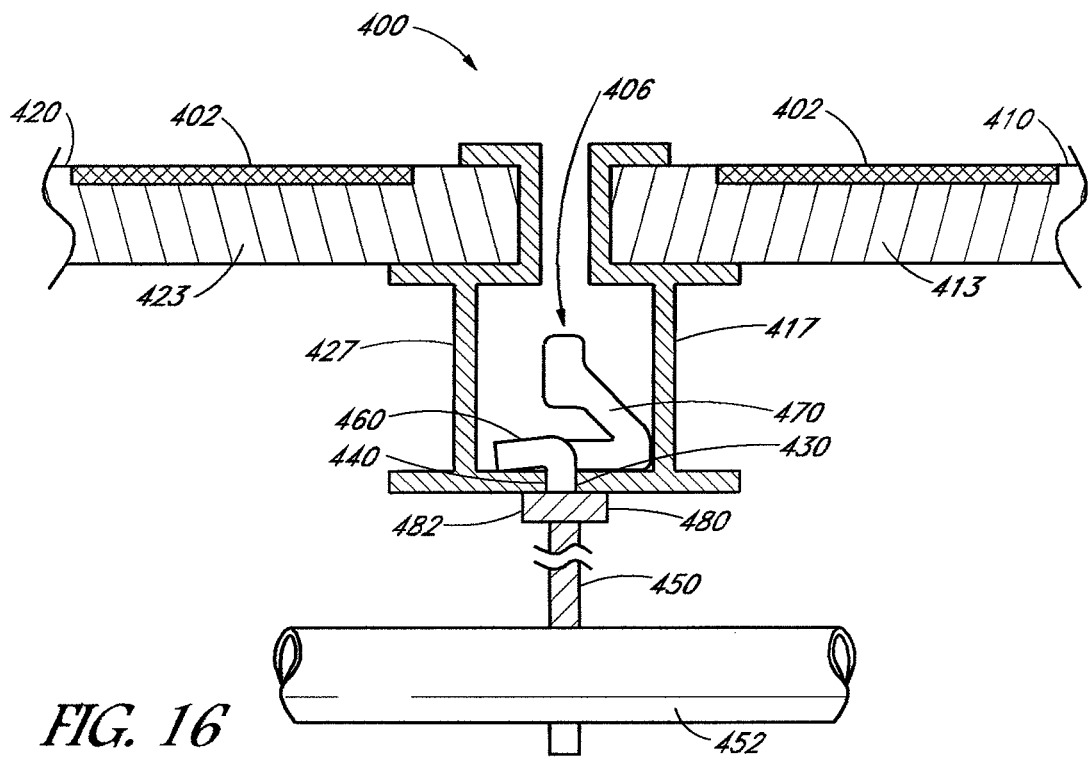
FIG. 16 is a schematic cross-sectional diagram of the photovoltaic assembly of FIG. 15 in accordance with yet another embodiment.

FIG. 16 illustrates a schematic cross-sectional diagram of the PV assembly 400 described in association with FIG. 15. The I-beam frame 427 of first side 440 of the second PV module 420 is to be secured to the coupling platform 406. The I-beam frames 417, 427 can include receptacles which are provided to receive the upright hook shaped retaining devices 460, 462 and the retractable locking mechanisms 470, 472. In some embodiments, the I-beam frame design enables the first side 440 of the second PV module 420 to prevent the movement of a retractable locking mechanism 470, 472. Also, a first support flange 480 and a second support flange 482 can be included to provide additional structural support.

Figure 17:
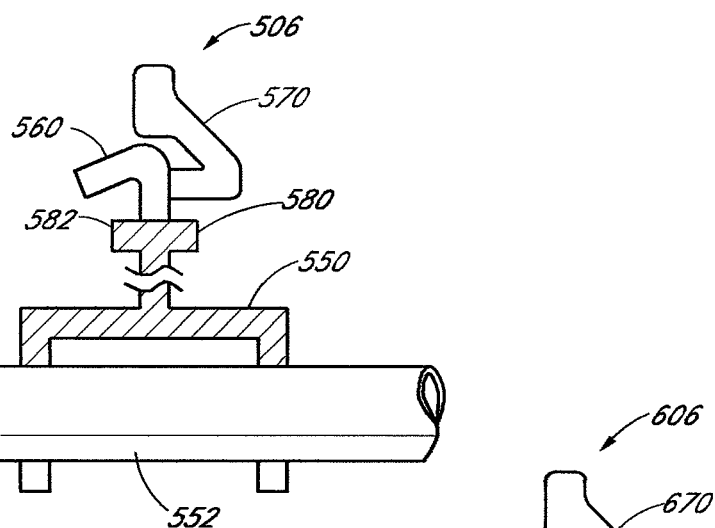
FIG. 17 is a schematic cross-sectional diagram of a coupling platform in accordance with an embodiment.

With reference to FIG. 17, a schematic perspective view of an embodiment for a coupling platform 506 is shown. The coupling platform can have an upright hook shaped retaining device 560, a retractable locking mechanism 570, a first support flange 580, a second support flange 582, a torque tube 552 and a U-shaped support member 550. The U-shaped support member 550 can provide additional structural support.

Figure 18:
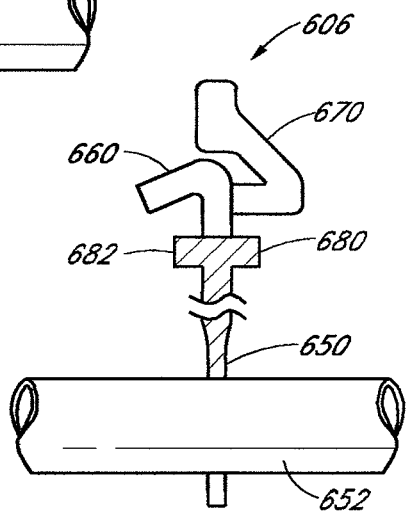
FIG. 18 is a schematic cross-sectional diagram of a coupling platform in accordance with another embodiment.

FIG. 18 illustrates a schematic perspective view of another embodiment for a coupling platform 606. As discussed above, the coupling platform can have an upright hook shaped retaining device 660, a retractable locking mechanism 670, a first support flange 680, a second support flange 682, a torque tube 652 and a thin support member 650. The thin support 650 member can be constructed of the least material as compared to other embodiments and therefore it can have a relatively lower cost to manufacture.

Figure 19:
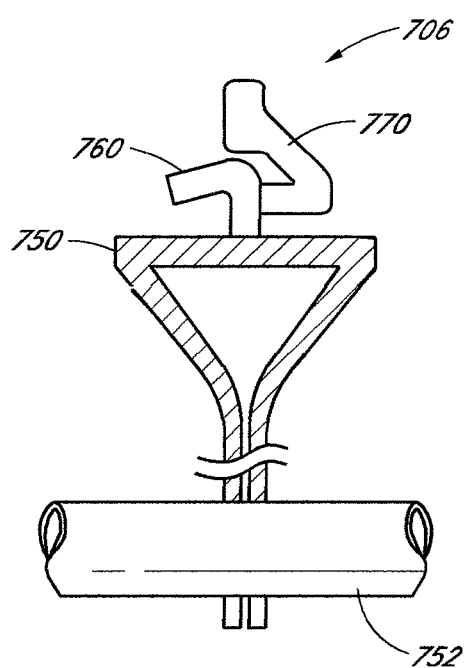
FIG. 19 is a schematic cross-sectional diagram of a coupling platform in accordance with still another embodiment.

With reference to FIG. 19, a schematic perspective view of still another embodiment for a coupling platform 706 is shown. The coupling platform can have an upright hook shaped retaining device 760, a retractable locking mechanism 770, a torque tube 752 and a hybrid support member 750. In one embodiment, the hybrid support member 750 is a combination of all other coupling platform embodiments previously disclosed.

Figure 20:
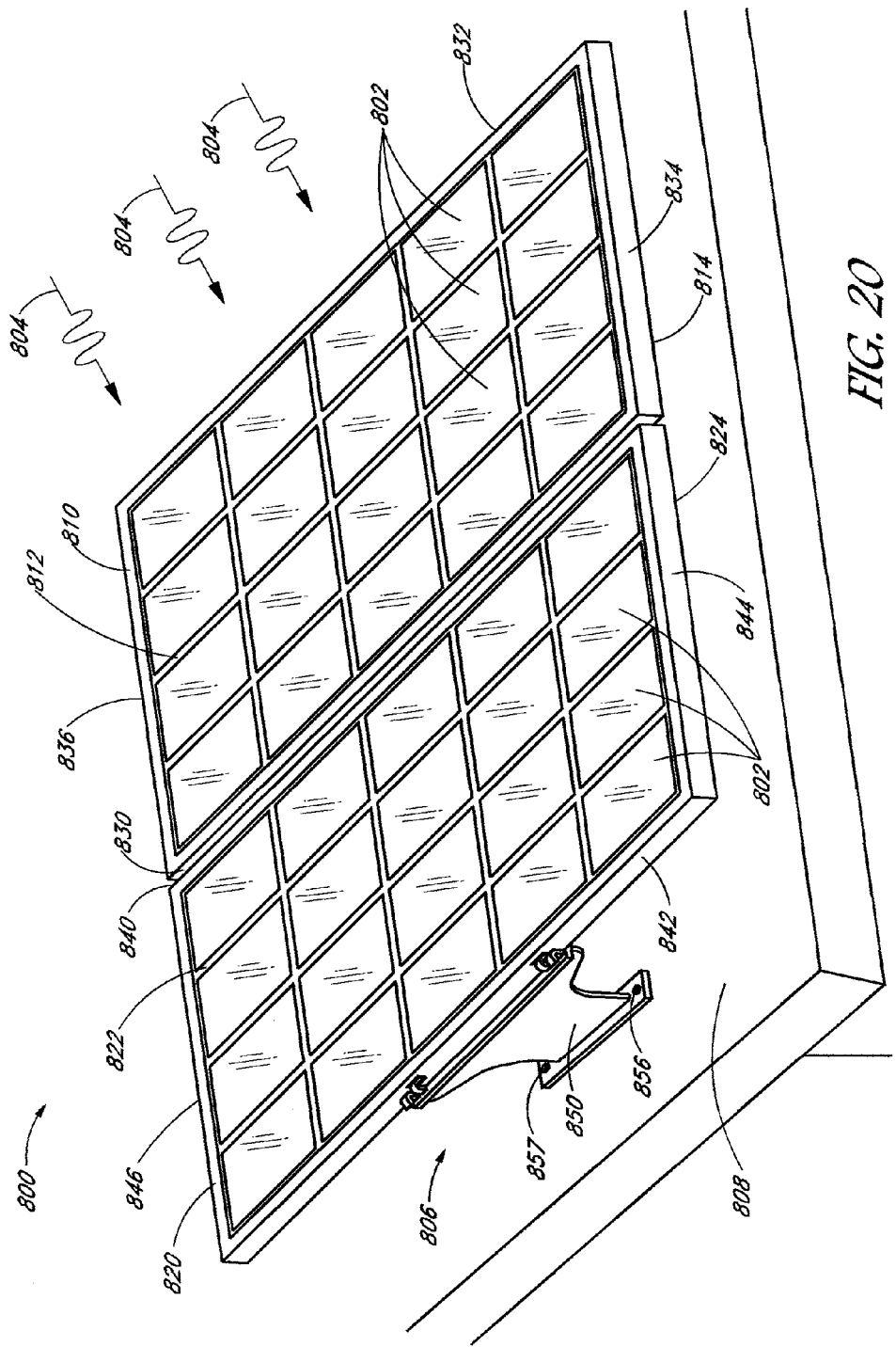
FIG. 20 is a schematic perspective view of a photovoltaic assembly in accordance with yet another embodiment.

FIG. 20 illustrates a schematic perspective view of still another embodiment for a PV assembly 800. Referring to the above, the PV assembly 800 depicted in FIG. 20 is similar to the assemblies described in FIG. 1, with the exception that the coupling platform 806 is composed of a mounting support 850 mounted on a roof 808 by a first screw 856 and a second screw 857. In general, such a PV assembly may be useful for mounting on roof top installations.

Figure 21:
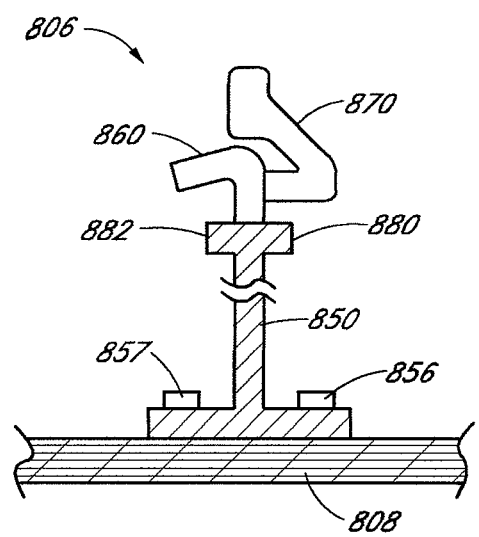
FIG. 21 is a schematic cross-sectional diagram of the coupling platform of FIG. 20 in accordance with yet another embodiment.

With reference to FIG. 21, a schematic cross-sectional diagram of another embodiment of the coupling platform 806 described in association with FIG. 20 is depicted. The coupling platform can have an upright hook shaped retaining device 860, a retractable locking mechanism 870, a first support flange 880, a second support flange 882 and a mounting support 850. In an embodiment, the mounting support 850 is provided to firmly secure the coupling platform 806 to the roof 808 by a first screw 856 and a second screw 857.

Figure 22:
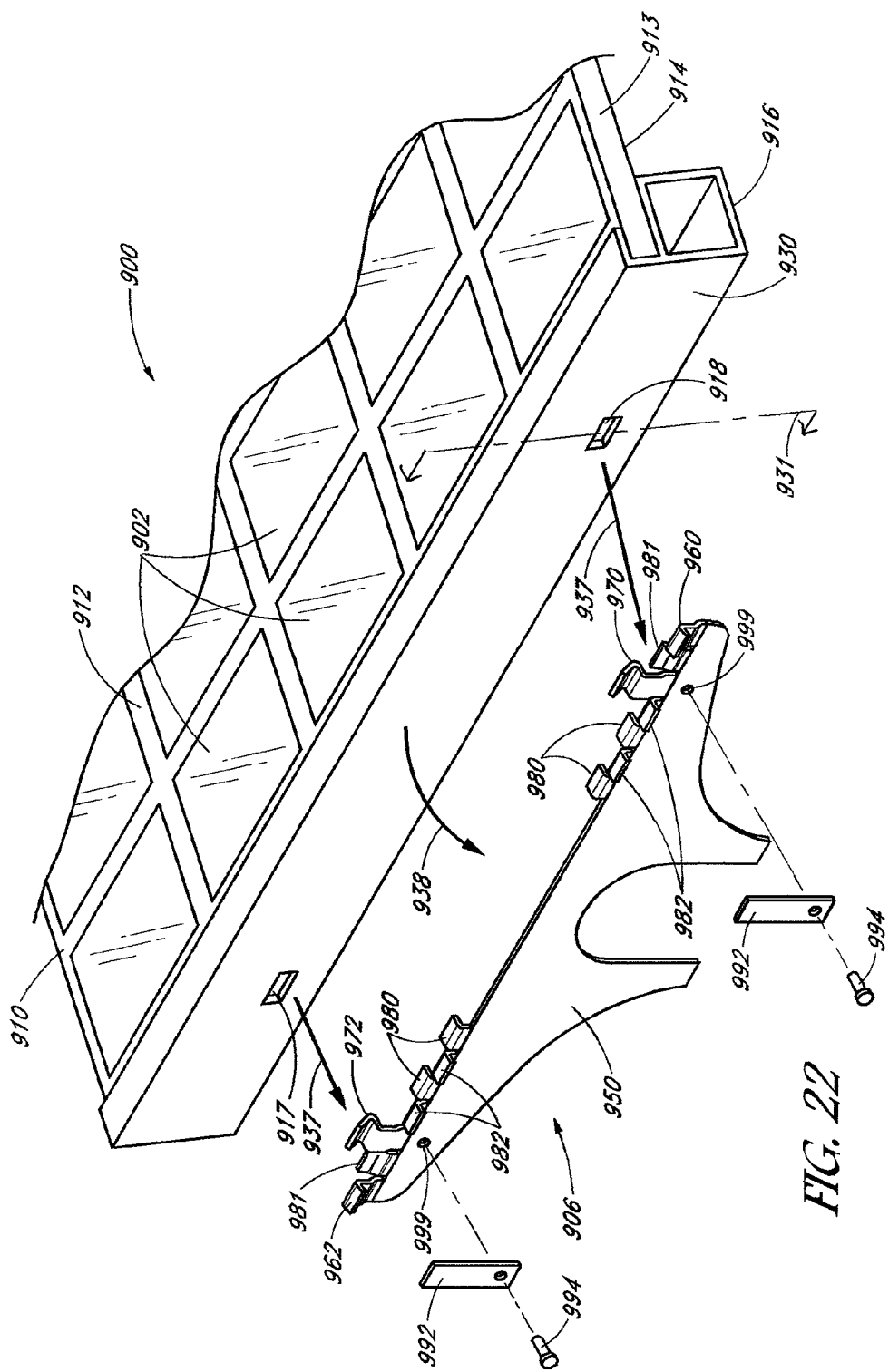
FIG. 22 is a schematic cross-sectional diagram of the coupling platform of FIG. 20 in accordance with still another embodiment.

FIG. 22 illustrates a schematic perspective view of still another embodiment for the PV assembly 900. In an embodiment, a pair of tabs 992 can be coupled to the support member 950 through the screws 994 received by the holes 999. Coupling the tabs 992 to the support member 950 can prevent the retractable locking mechanism 970 from releasing and effectively secure the last PV Module 910 within a row to the coupling platform 906. For illustrative purposes, a dotted cross-sectional line 931 is shown. In an embodiment the screws can comprise instead a pair of bolts, in another embodiment the screws can instead comprise a pair of rivets. These lines act as guides for the schematic cross-sectional diagram shown in FIG. 23.

Figure 23:
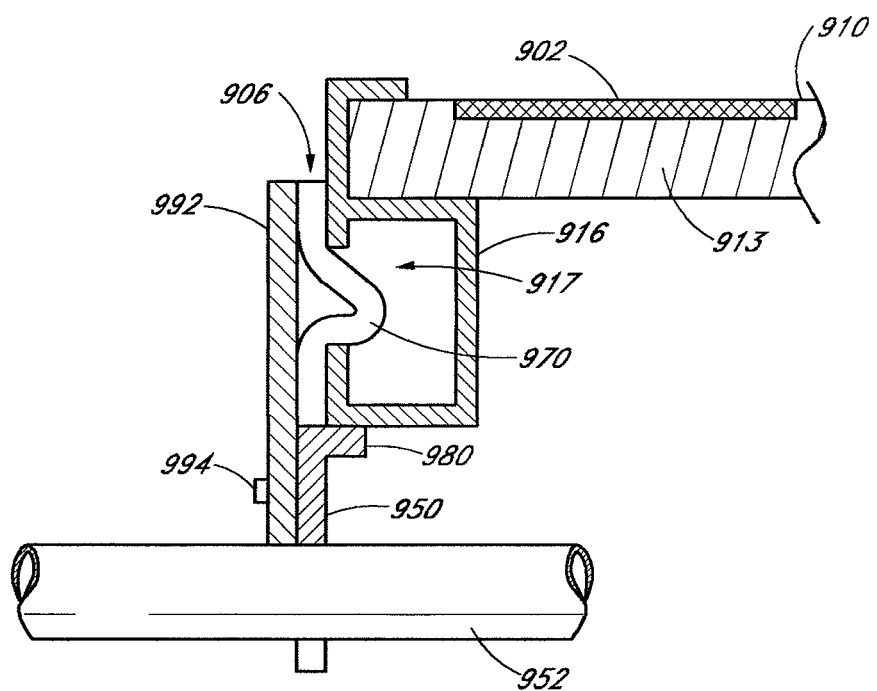
FIG. 23 is a schematic perspective view of the coupling platform of FIG. 20 in accordance with another embodiment.

FIG. 23 illustrates a schematic cross-sectional diagram of another embodiment for the PV assembly 900. A tab 992 can be coupled to a support member 950 using a screw 994, preventing the retractable locking mechanism 970 from releasing. Thus, there is no limitation to the use of a pair of tabs 992 and screws 994 for securing a last PV module 910 to the coupling platform 906 located at the end of a row in combination with any one of the previously described embodiments above.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A photovoltaic (PV) assembly comprising:
a first and second PV module, each module comprising:
a front side facing the sun during normal operation and a back side opposite the front side;
a frame surrounding the PV module comprising:
first, second, third and fourth sides; and
a plurality of openings disposed within the frame; and
a coupling platform comprising:
a retractable locking mechanism adapted to attach to the opening at the first side of the first PV module;
an upright hook shaped retaining device adapted to attach to the opening at the first side of the second PV module, wherein the upright hook shaped retaining device is positioned such that the first side of the second PV module inhibits the retractable locking mechanism from releasing the first PV module; and
a support member.

2. The PV assembly of claim 1, wherein the retractable locking mechanism comprises an upright latch.

3. The PV assembly of claim 1, wherein the coupling platform further comprises a plurality of horizontal bent flanges extending laterally from the coupling platform, below the retractable locking mechanism and adapted to support the first and second PV module.

4. The PV assembly of claim 1, wherein the upright hook shaped retaining device comprises a directional hook retaining device adapted to locate features within the opening at a specific side of the PV module.

5. The PV assembly of claim 1, wherein the support member comprises a U-shaped saddle mount adapted to attach the coupling platform to a torque tube.

6. The PV assembly of claim 1, wherein the support member comprises a mounting support adapted to secure the coupling platform onto a roof top.

7. The PV assembly of claim 1, wherein the coupling platform comprises aluminum or galvanized steel.

8. A photovoltaic (PV) assembly comprising:
a first and second PV module, each PV module comprising:
a front side facing the sun during normal operation and a back side opposite the front side; and
a first, second, third and fourth side; and
a coupling platform comprising:
a retractable locking mechanism adapted to receive the first side of the first PV module;
a U-shaped retaining device adapted to receive the first side of the second PV module, wherein the U-shaped retaining device is positioned such that the first side of the second PV module inhibits the retractable locking mechanism from releasing the first PV module; and
a support member.

9. The PV assembly of claim 8 wherein each of the first and second PV module further comprising an edge protection member fixed along all sides of each of the first and second PV module.

10. The PV assembly of claim 8 further comprising a plurality of horizontal bent flanges extending laterally from the coupling platform, below the retractable locking mechanism and adapted to support the first and second PV module.

11. The PV assembly of claim 8, wherein the support member comprises a U-shaped saddle mount adapted to attach the coupling platform to a torque tube.

12. The PV assembly of claim 8, wherein the support member comprises a thin saddle mount adapted to attach the coupling platform to a torque tube.

13. The PV assembly of claim 8, wherein the support member comprises a hybrid saddle mount adapted to attach the coupling platform to a torque tube.

14. The PV assembly of claim 8, wherein the support member comprises a mounting support adapted to secure the coupling platform onto a roof top.

15. A photovoltaic (PV) assembly comprising:
a first and second PV module, each module comprising:
a front side facing the sun during normal operation and a back side opposite the front side;
an I-beam frame surrounding the PV module comprising:
a first, second, third and fourth side; and
a plurality of receptacles disposed within the I-beam frame; and
a coupling platform comprising:
a retractable locking mechanism adapted to attach to the receptacle at the first side of the first PV module;
an upright hook shaped retaining device adapted to attach to the receptacle at the first side of the second PV module, wherein the upright hook shaped retaining device is positioned such that the first side of the second PV module inhibits the retractable locking mechanism from releasing the first PV module; and
a support member.

16. The PV assembly of claim 15 wherein the upright hook shaped retaining device comprises a directional hook retaining device adapted to locate features within the opening at a specific side of the PV module.

17. The PV assembly of claim 15, wherein the support member comprises a U-shaped saddle mount adapted to attach the coupling platform to a torque tube.

18. The PV assembly of claim 15, wherein the support member comprises a thin saddle mount adapted to attach the coupling platform to a torque tube.

19. The PV assembly of claim 15, wherein the support member comprises a hybrid saddle mount adapted to attach the coupling platform to a torque tube.

20. The PV assembly of claim 15, wherein the support member comprises a mounting support adapted to secure the coupling platform onto a roof top.

* * * * *